US007941757B2

(12) United States Patent
Weber et al.

(10) Patent No.: US 7,941,757 B2
(45) Date of Patent: May 10, 2011

(54) METHOD AND APPARATUS FOR CREATING MULTIMEDIA PRESENTATIONS

(75) Inventors: Ralf Weber, Santa Clara, CA (US); Jeff Mitchell, Sunset Terrace, CA (US); Tim Wasko, High River (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/416,923

(22) Filed: Apr. 1, 2009

(65) Prior Publication Data

US 2009/0249211 A1 Oct. 1, 2009

Related U.S. Application Data

(62) Division of application No. 10/337,924, filed on Jan. 6, 2003, now Pat. No. 7,546,544.

(51) Int. Cl.
G06F 3/00 (2006.01)

(52) U.S. Cl. ........................................................ 715/763
(58) Field of Classification Search .................... 715/730
See application file for complete search history.

(56) References Cited

U.S. PATENT DOCUMENTS

| | | |
|---|---|---|
| 5,519,828 A | 5/1996 | Rayner |
| 5,737,552 A | 4/1998 | Lavallee et al. |
| 5,752,029 A | 5/1998 | Wissner |
| 5,778,108 A | 7/1998 | Coleman, Jr. |
| 5,956,026 A | 9/1999 | Ratakonda |
| 5,995,095 A | 11/1999 | Ratakonda |
| 6,064,438 A | 5/2000 | Miller |
| 6,111,562 A * | 8/2000 | Downs et al. ................. 715/862 |
| 6,230,172 B1 | 5/2001 | Purnaveja et al. |
| 6,307,550 B1 | 10/2001 | Chen et al. |
| 6,453,459 B1 | 9/2002 | Brodersen et al. |
| 6,714,216 B2 | 3/2004 | Abe |
| 6,731,295 B1 * | 5/2004 | MacInnis et al. ............. 345/581 |
| 6,760,042 B2 | 7/2004 | Zetts |
| 6,912,327 B1 | 6/2005 | Hori et al. |
| 6,928,613 B1 * | 8/2005 | Ishii et al. .................... 715/726 |
| 6,954,894 B1 | 10/2005 | Balnaves et al. |
| 6,988,244 B1 | 1/2006 | Honda et al. |
| 7,030,872 B2 | 4/2006 | Tazaki |
| 7,089,496 B2 | 8/2006 | Hanes |
| 7,124,366 B2 | 10/2006 | Foreman et al. |
| 7,127,149 B1 | 10/2006 | Lin |
| 7,165,219 B1 | 1/2007 | Peters et al. |
| 7,200,836 B2 | 4/2007 | Brodersen et al. |
| 7,224,365 B1 * | 5/2007 | Seideman et al. ............. 345/473 |
| 7,546,544 B1 | 6/2009 | Weber et al. |
| 7,694,225 B1 | 4/2010 | Weber et al. |
| 2002/0019833 A1 | 2/2002 | Hanamoto |

(Continued)

OTHER PUBLICATIONS

U.S. Appl. No. 10/337,907, filed Jan. 6, 2003, Weber, Ralf, et al.

(Continued)

Primary Examiner — Ryan F Pitaro
(74) Attorney, Agent, or Firm — Adeli & Tollen, LLP

(57) ABSTRACT

Some embodiments of the invention provide a computerized method for creating and editing a multimedia item. The method provides a menu theme for a multimedia item. The menu theme includes a display section for displaying a multimedia item, an adjustable text section for displaying several selectable text options, and a special effect built into the menu theme for applying to the multimedia item. The method presents the multimedia item on display after applying the special effect to the multimedia item.

23 Claims, 10 Drawing Sheets

U.S. PATENT DOCUMENTS

| | | | |
|---|---|---|---|
| 2002/0119833 A1* | 8/2002 | Dewanjee | 473/371 |
| 2002/0167540 A1 | 11/2002 | Dobbelaar | |
| 2002/0180803 A1 | 12/2002 | Kaplan et al. | |
| 2002/0194195 A1 | 12/2002 | Fenton et al. | |
| 2002/0198909 A1 | 12/2002 | Huynh et al. | |
| 2003/0016240 A1 | 1/2003 | Hanes | |
| 2003/0090507 A1 | 5/2003 | Randall et al. | |
| 2003/0189588 A1 | 10/2003 | Girgensohn et al. | |
| 2003/0193520 A1 | 10/2003 | Oetzel | |
| 2003/0210261 A1 | 11/2003 | Wu et al. | |
| 2004/0017390 A1 | 1/2004 | Knowlton et al. | |
| 2004/0021684 A1 | 2/2004 | Millner | |
| 2004/0085340 A1 | 5/2004 | Dimitrova et al. | |
| 2004/0125124 A1 | 7/2004 | Kim et al. | |
| 2004/0125129 A1 | 7/2004 | Marsh | |
| 2004/0125133 A1 | 7/2004 | Pea et al. | |
| 2004/0201610 A1 | 10/2004 | Rosen et al. | |
| 2004/0221227 A1 | 11/2004 | Wu | |

OTHER PUBLICATIONS

U.S. Appl. No. 10/742,957, filed Dec. 20, 2003, Weber, Ralf, et al.

Final Office Action of U.S. Appl. No. 10/337,924, Nov. 1, 2006 (mailing date), Weber, Ralf, et al.

Non-Final Office Action of U.S. Appl. No. 10/337,924, Apr. 4, 2006 (mailing date), Weber, Ralf, et al.

Non-Final Office Action of U.S. Appl. No. 10/742,957, Apr. 19, 2007 (mailing date), Weber, Ralf, et al.

Non-Final Office Action of U.S. Appl. No. 10/337,907, Aug. 22, 2007 (mailing date), Weber, Ralf, et al.

Final Office Action of U.S. Appl. No. 10/742,957, Nov. 28, 2007 (mailing date), Weber, Ralf, et al.

Final Office Action of U.S. Appl. No. 10/337,924, Dec. 27, 2007 (mailing date), Weber, Ralf, et al.

Final Office Action of U.S. Appl. No. 10/337,907, Mar. 24, 2008 (mailing date), Weber, Ralf, et al.

Non-Final Office Action of U.S. Appl. No. 10/742,957, May 22, 2008 (mailing date), Weber, Ralf, et al.

Non-Final Office Action of U.S. Appl. No. 10/337,924, Sep. 3, 2008 (mailing date), Weber, Ralf, et al.

Non-Final Office Action of U.S. Appl. No. 10/337,907, Oct. 14, 2008 (mailing date), Weber, Ralf, et al.

Final Office Action of U.S. Appl. No. 10/742,957, Mar. 3, 2009 (mailing date), Weber, Ralf, et al.

Final Office Action of U.S. Appl. No. 10/337,907, Jun. 5, 2009 (mailing date), Weber, Ralf, et al.

Microsoft, Paint, 1981-2001 Month N/A, Software, Figs. 1-3.

Ken Stone, Authoring with iDVD 2—OS 10.1, Dec. 17, 2001, Internet: http://www.kenstone.net/fcp_homepage/basic_idvd_2.html, Retrieved: Mar. 24, 2006, pp. 1-11.

U.S. Appl. No. 12/689,149, filed Jan.18, 2010, Weber, Ralf, et al.

Updated portions of prosecution history for U.S. Appl. No. 10/337,924, Mar. 30, 2009, Weber, Ralf, et al.

Updated portions of prosecution history for U.S. Appl. No. 10/742,957, Jun. 25, 2010, Weber, Ralf, et al.

Ozer, Jan, "DVD Authoring", Jan. 2005, PC Magazine, vol. 24 Issue 1, p. 160

Zaman, Ashok, "DVD Authoring Software", Sep. 2005, APC (Australian Personal Computer), vol. 25 Issue 9, pp. 68-74.

* cited by examiner

METHOD AND APPARATUS FOR CREATING MULTIMEDIA PRESENTATIONS

CLAIM OF BENEFIT TO PRIOR APPLICATION

This application is a divisional application of U.S. patent application Ser. No. 10/337,924, entitled "Method and Apparatus for Creating Multimedia Presentations", filed Jan. 6, 2003, now issued as U.S. Pat. No. 7,546,544, U.S. Pat. No. 7,546,544 is incorporated herein by reference.

FIELD OF INVENTION

The invention relates to multimedia authoring application. Specifically, a method and apparatus for easily creating dynamic customized interactive menus is disclosed.

BACKGROUND OF INVENTION

Multimedia authoring applications allow user to create and edit multimedia items for distribution. These multimedia items often have menu presentations. The presentations typically include a graphical display and a selectable menu separate from the graphical display. The menus allow users to play the multimedia item or advance to a particular scene in the multimedia item.

SUMMARY OF THE INVENTION

Some embodiments of the invention provide a computerized method for creating and editing a multimedia item. The method provides a menu theme for a multimedia item. The menu theme includes a background graphics for displaying a multimedia item and selectable menu text. A menu theme may include one or more dropzones wherein a still image, a set of still images for a slideshow, or a movie may be dropped.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Multimedia Authoring Application Overview

The present invention introduces a multimedia authoring application to create and edit multimedia items, such as Digital Versatile Discs (DVDs), for distribution. The system of the present invention allows a user to easily create a dynamic and interactive menu presentation for the multimedia item. These menu presentations keep a viewer of the multimedia item occupied and entertained until the user selects one of the menu items displayed to the user.

The multimedia authoring application allows the user to create dynamic menu presentations using one of many pre-designed menu 'themes.' Each menu theme is a template menu that may be customized by the user. Each menu theme may include background graphics, selectable menu text, and special effects that affect the appearance the menu theme. The background graphics vary for each menu theme. The background graphics may include still images, image slide shows, and short movies. The user may modify the background graphics. The selectable menu text is modifiable and it serves as an interactive menu that allows the user to begin viewing the multimedia item (play the movie for a DVD), navigate to submenus, view additional features, advance to a specific scene in the multimedia item, or navigate to other features.

The multimedia authoring application displays the menu theme in a display area and allows a user to add additional multimedia graphics to the menu theme. The user is allowed to select a multimedia graphic from a list of multimedia graphics and easily import the selected multimedia graphic into the menu theme display area. The added multimedia graphics may comprise still images, a set of images to be displayed in a slide show or a short motion picture. Once the user selects a multimedia graphic, the multimedia authoring application formats the multimedia graphic to apply the special effect that is build into the menu theme and displays the menu multimedia graphic in the menu theme's background graphics.

The ability to easily create and edit multimedia presentations by adding a dynamic menu presentation is advantageous. Dynamic menu presentations not only keep a user entertained at the first instance of inserting the multimedia item into a multimedia player, but also enhance the overall appearance of the multimedia item. One advantageous feature of the menu page is that it may provide the user with a glimpse of the multimedia content that is on multimedia item.

Example Multimedia Authoring Application Usage

Figure 1:
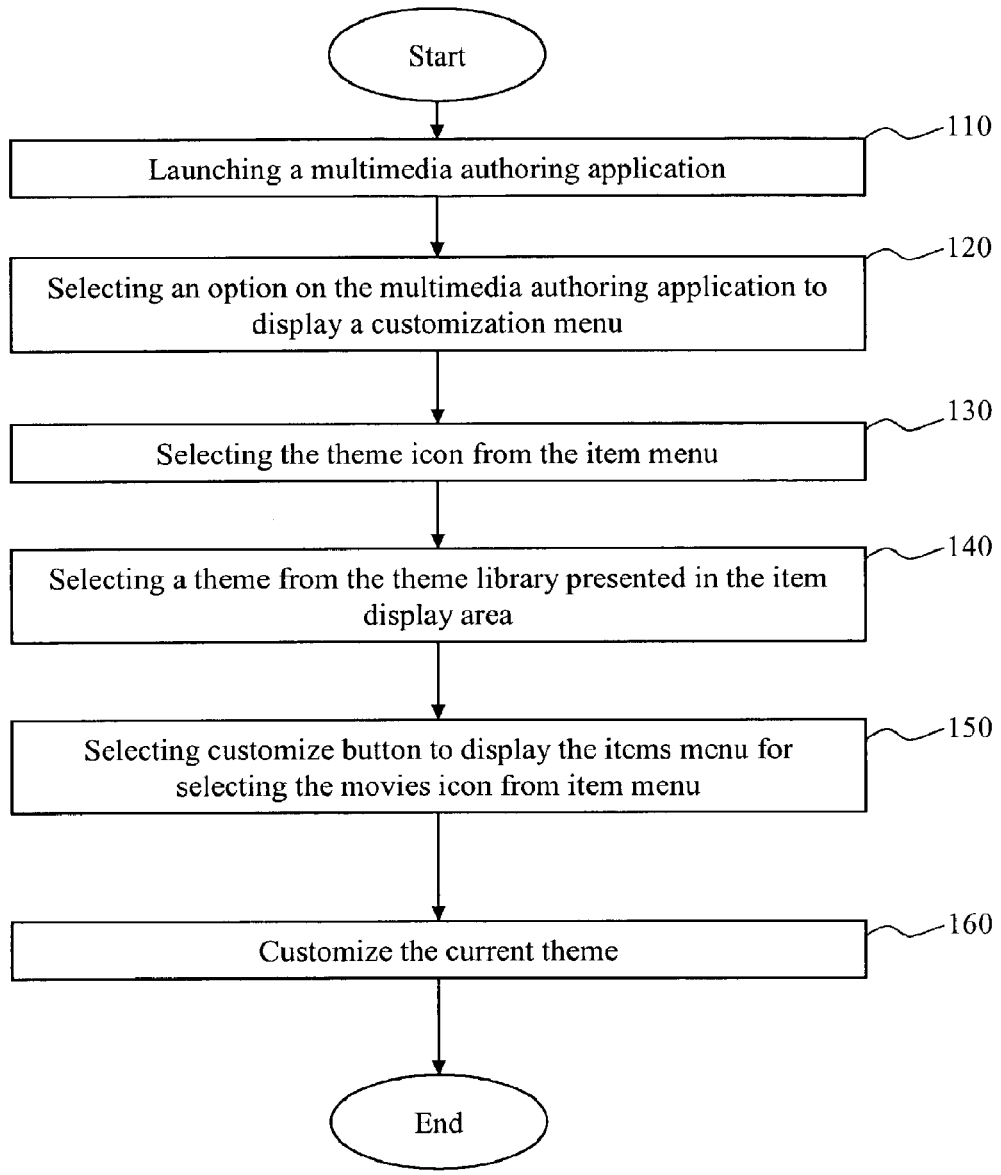
FIG. 1 illustrates a flow diagram of an example interaction between a user and the multimedia authoring application for creating and editing a multimedia menu.
Figure 2:
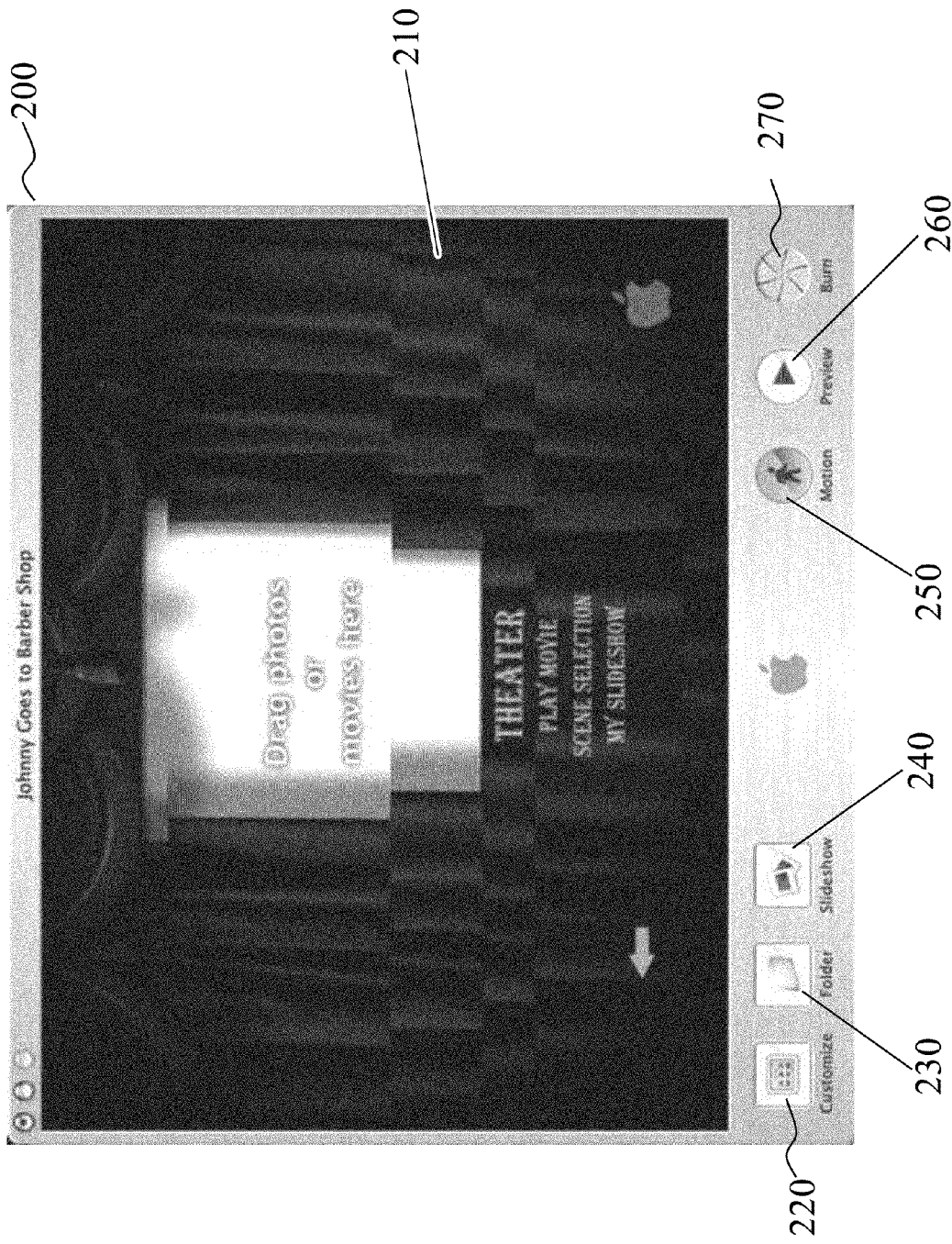
FIG. 2 illustrates the graphical user interface for the multimedia authoring application used for creating and editing multimedia items according to one embodiment.

FIG. 1 illustrates a flow diagram of one possible interaction between the user and the multimedia authoring application for creating and editing a multimedia item. Each of the steps in FIG. 1 will be further described with reference to FIGS. 2 to 8. Initially, at step 110, a user selects a button or icon on their computer screen to launch the multimedia authoring application. FIG. 2 illustrates one possible embodiment of a multimedia authoring application 200, such as a DVD multimedia authoring application for creating and editing multimedia items. The multimedia authoring application 200 includes a display area 210 and several selectable buttons 220 to 270.

The display area 210 is used by the multimedia authoring application 200 to display the menu that is being created including menu graphics and menu text. The menu graphics may consist of still images, slideshows of still images, and short motion pictures. Audio clips may also be added to a menu theme. In one embodiment, a default menu theme is loaded when the application is launched. FIG. 2 illustrates a simple theatre menu theme that consists of a pair of animated theatre curtains.

The selectable buttons 220 to 270 of the multimedia authoring application 200 allow the user to perform various different operations such as importing menu graphics. The customize button 220 allows the user to customize settings of the multimedia authoring application 200, such as brightness, contrast, volume etc. The folder button 230 allows the user to navigate to various folders on the user's computer for either retrieving or saving various types of data including the menu being created for the multimedia item. The slide show button 240 allows the user to import several slides in a slideshow format for displaying on the multimedia authoring application 200. The motion button 250 allows the user to toggle whether or not any motion pictures in the menu will be displayed in motion. The preview button 260 allows the user to perform a simulation of how the interactive menu will operate if created. The burn button 230 allows the user to produce a final multimedia object, such as a DVD, with the created multimedia menu. In a DVD system, the burn button composites all of the graphics that define the menu and creates a single MPEG video that will be displayed behind the selectable menu text.

Figure 3:
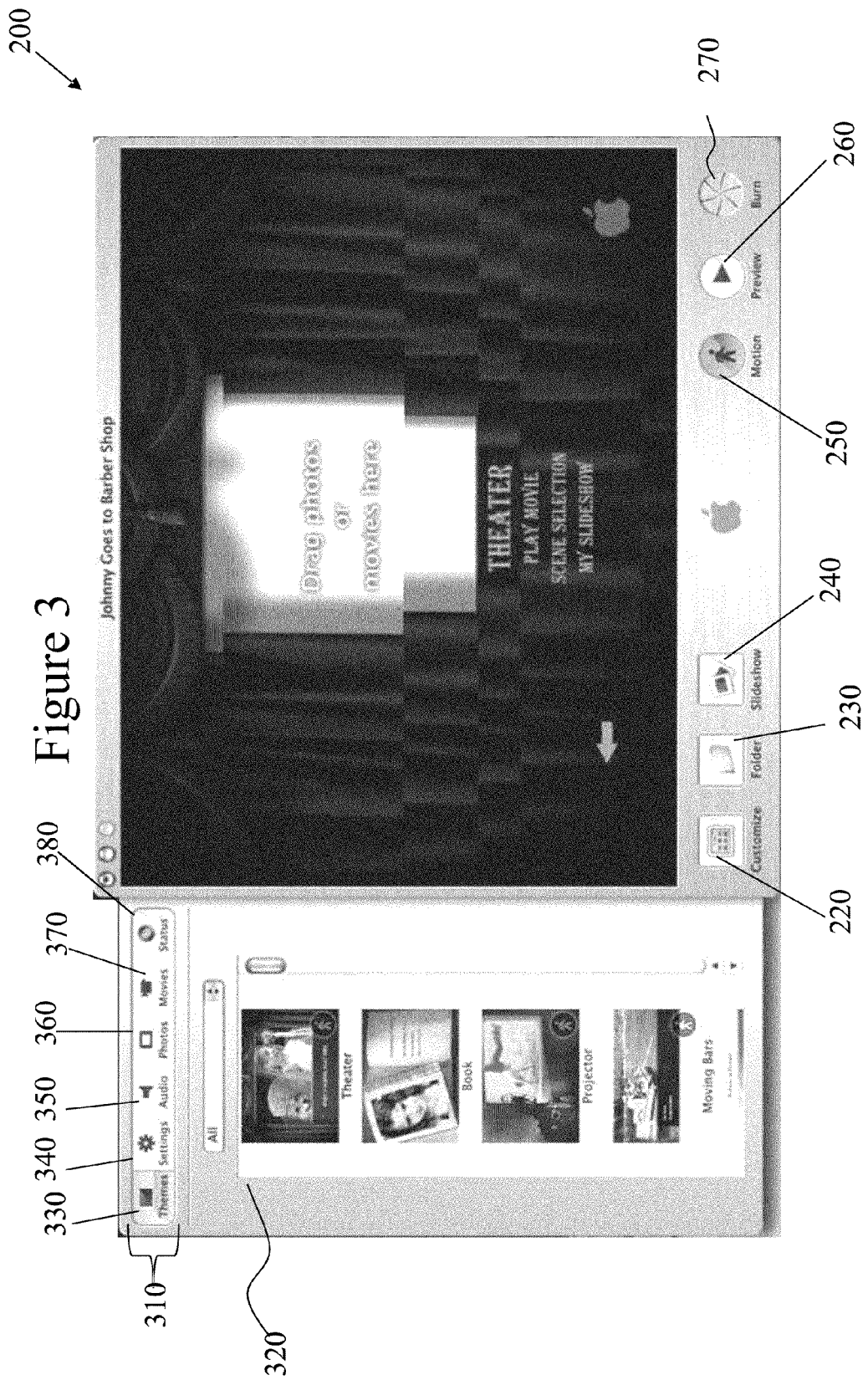
FIG. 3 illustrates the graphical user interface of FIG. 3 with customize menu presented by the multimedia authoring application.

Referring back to FIG. 1, the user may next select the customize button 220 to bring up a list of options for customizing the menu. FIG. 3 illustrates how the multimedia authoring application may appear on the user's computer screen after selecting the customize button 220.

Referring to FIG. 3, the customize button 220 brings up a customization list 310 that lists a number of different tools 330 to 380 that may be used to customize the menu. The user may select the menu themes button 330 to bring up a library of alternative menu themes that may be selected. The user may select the settings button 340 to bring up a list of settings that may be changed to affect how the menu is presented. The settings list allows the user to change display area parameters, such as brightness, contrast, sharpness, etc. The user may select the audio button 350 to bring up a library of different audio clips that may be added to the menu. The user may select the photos button 360 to bring up a library of digital images that may be added to the menu. The user may select the movies button 370 to bring up a library of movies that may be added to the menu. The user may choose an item displayed in any of these libraries or import their own menu theme, audio, photo, or movies using the file folder button 230. The user may either store an imported item in a library or use it directly in the multimedia authoring application 200.

Figure 4:
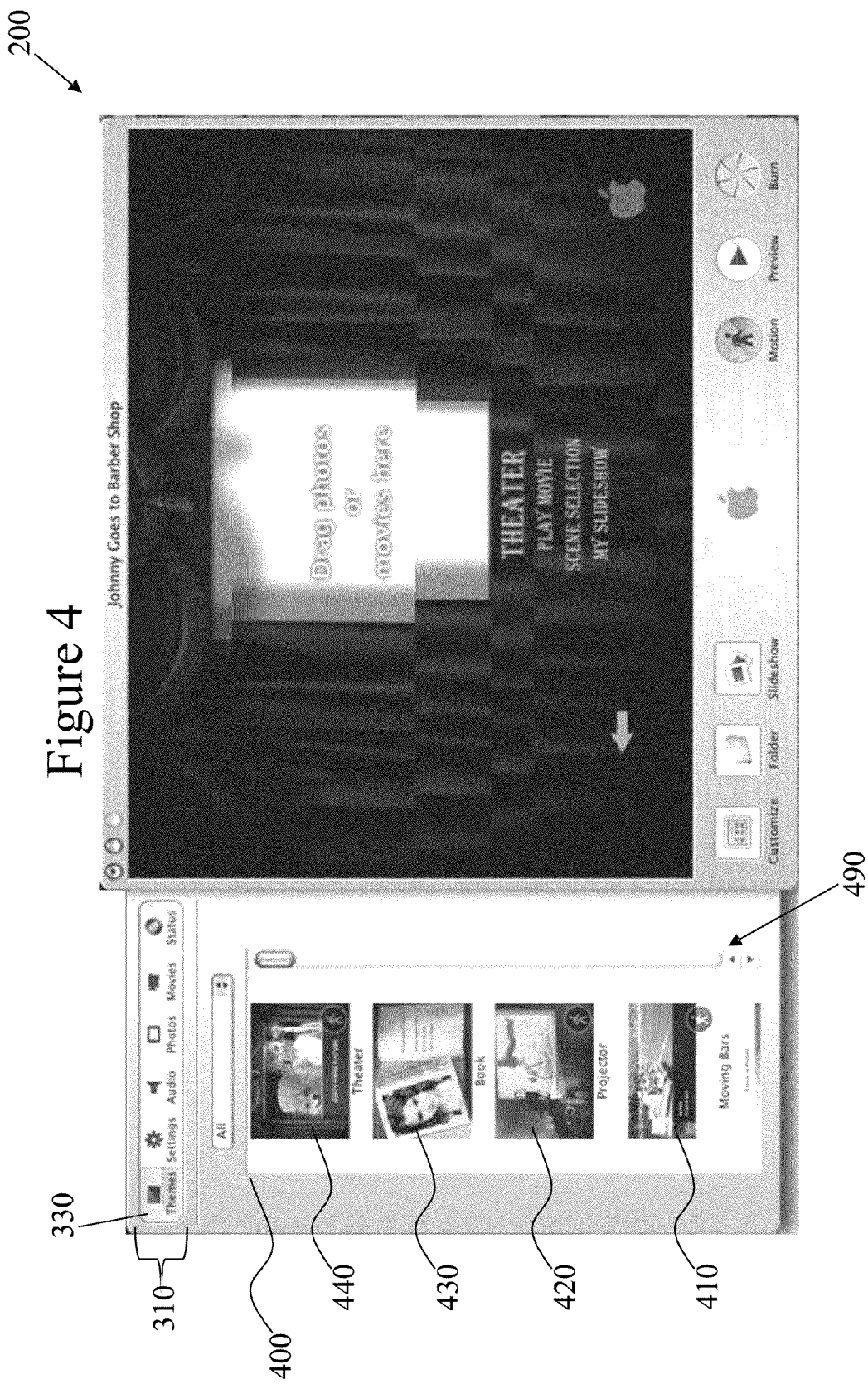
FIG. 4 illustrates a menu theme library that is presented by the multimedia authoring application upon user selection of the menu themes item.

Referring back to FIG. 1, at step 130 the user may select the menu themes button 330. Selecting the menu themes button 330 causes the menu authoring program to display the library of alternative menu themes in item display area 400 as shown in FIG. 4. The menu theme library includes several selectable menu themes 410 to 440. A user may select any of the menu themes 410 to 440 displayed in the menu theme library or install their own menu theme into the menu theme library for later use. Four menu themes 410 to 440 are illustrated within the item display area 400. Additional menu themes may be accessed by scrolling down the item display area 400 with the scroll bar 490.

Figure 5:
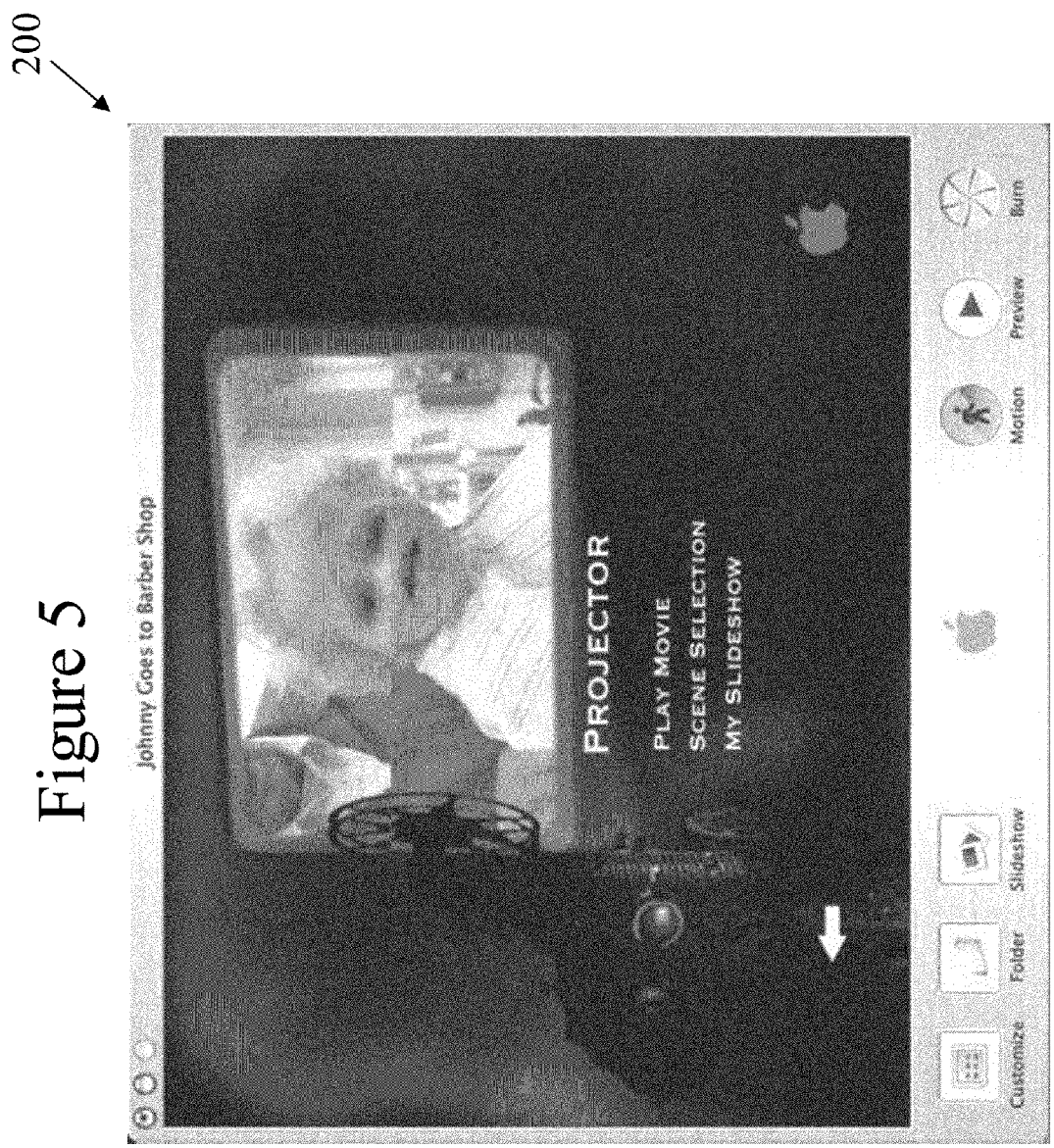
FIG. 5 illustrates an example of a different menu theme, a projector menu theme, that is presented by the multimedia authoring application upon user selection from the menu theme library.

Referring back to FIG. 1, at step 140 the user may select one of the menu themes 410 to 440 from the menu theme library 400. The selection may be made by having the user click on a particular menu theme using a computer mouse. Alternatively, the user may also use a keyboard, a touch screen, or similar method to select the desired menu theme. Once the user clicks on any of the menu themes 410 to 440, the multimedia authoring application 200 highlights the selected menu theme in the display area 400 indicting the selection and displays the selected menu theme in display area 210. For example, if the user selects the projector menu theme 420, it is highlighted and displayed in the display area of the multimedia authoring application as shown in FIG. 5.

Editing a Menu

Figure 6:
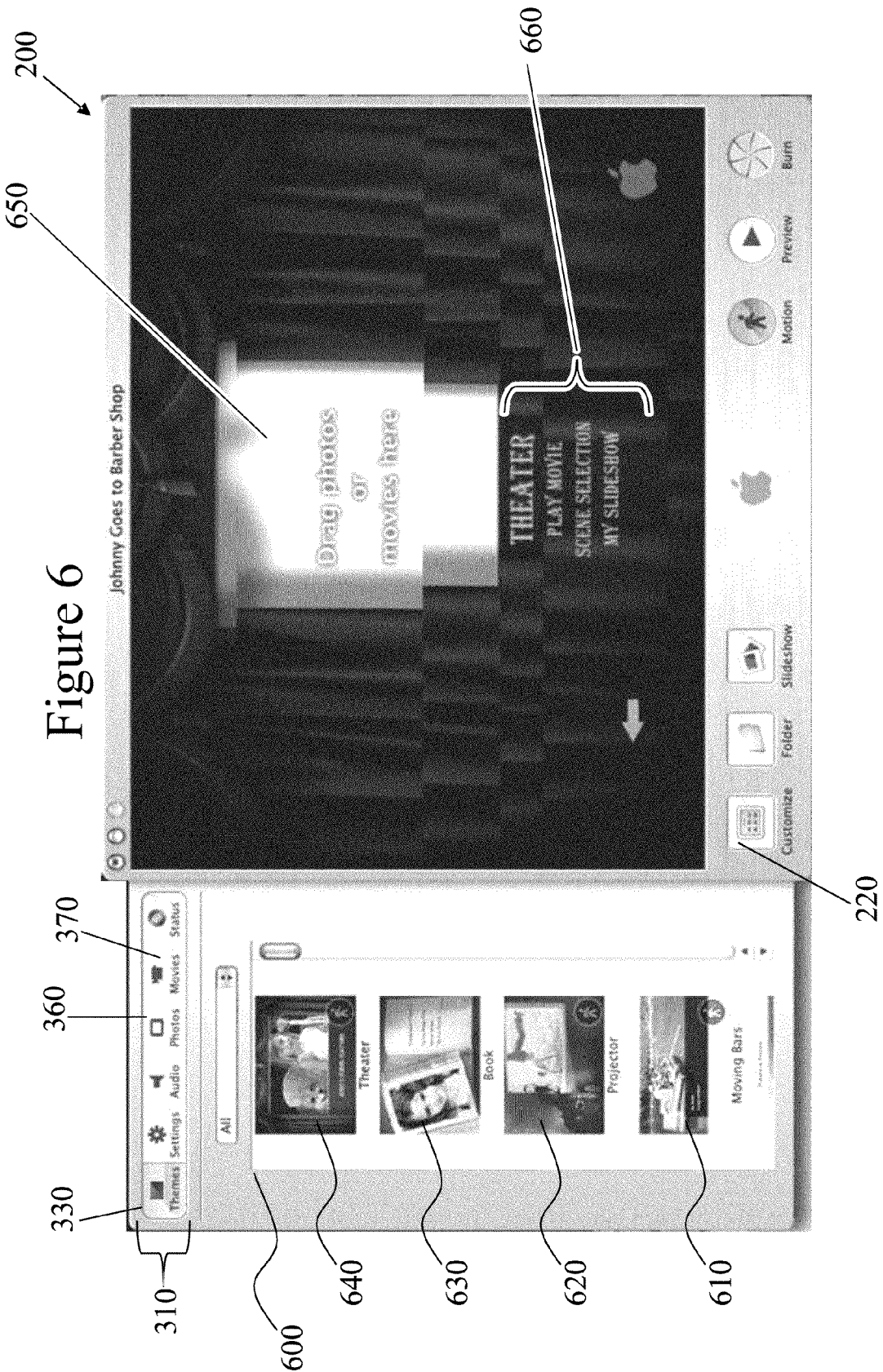
FIG. 6 illustrates details about a dropzone in the theatre menu theme.

FIG. 6 illustrates the theatre menu theme. The theatre menu theme provides a theatrical setting by having animated theatre curtains that open and close as a special effect. The theatre menu theme also includes a 'dropzone' area 650 and a selectable menu 660. The text of the selectable menu 660 may be modified by the user and the menu items may be linked to additional menu pages, a movie, a slideshow, or to other areas. A user may customize any menu theme with a dropzone area by placing customized graphics in the dropzone area. In a preferred embodiment, a user may drop a still image, a set of still images, or a movie on a drop zone area. If a still image is placed in the dropzone area, the still image will be displayed in the dropzone area. If a set of still images is placed in a dropzone area, those still images will be displayed sequentially in a slideshow style. If a movie is dropped in the dropzone area then several seconds of that movie will be displayed in the dropzone area in a looped manner.

Figure 7:
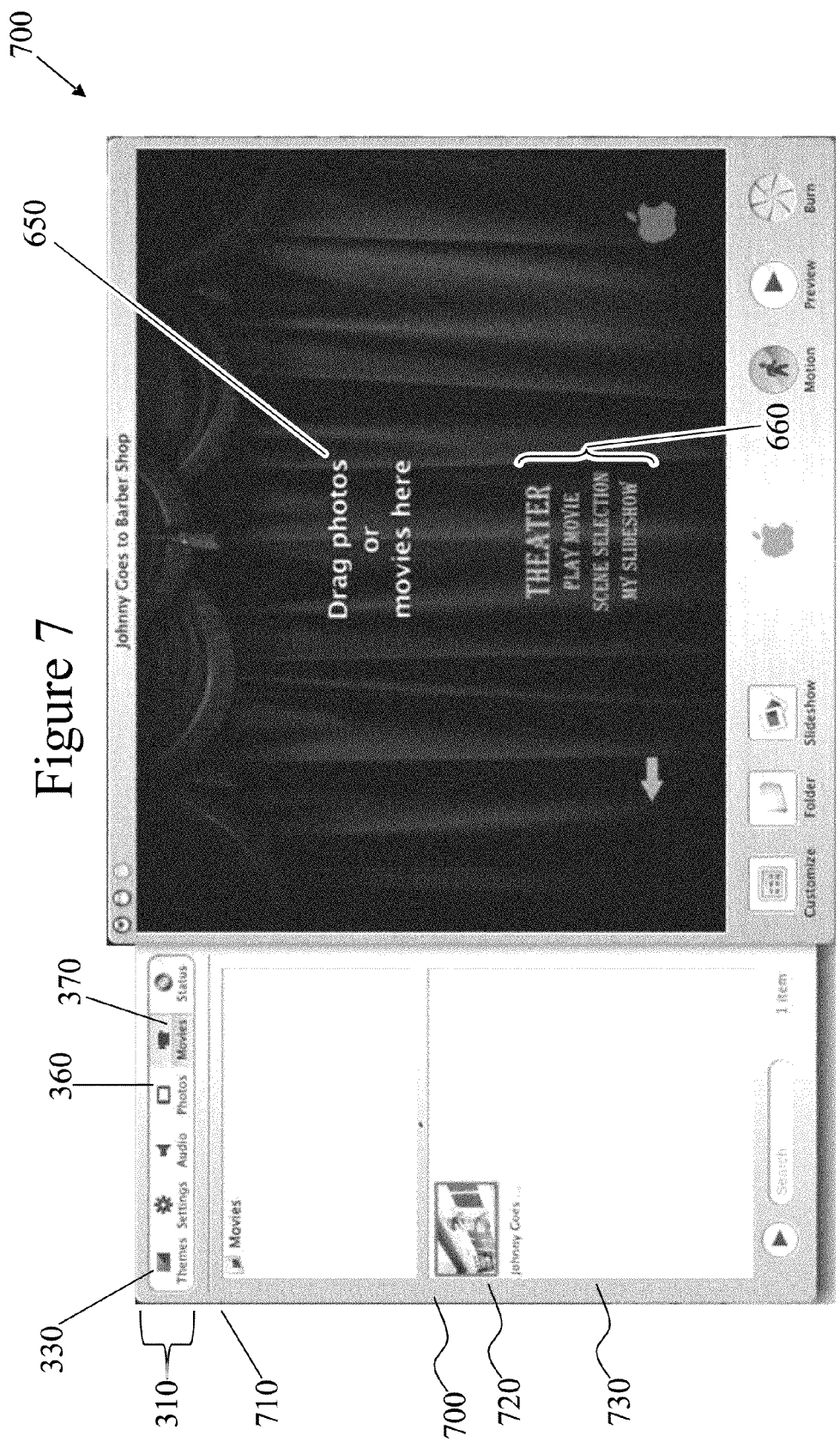
FIG. 7 illustrates the customization of the theatre menu theme by dropping a movie in the dropzone of the theatre menu theme.

Referring back to FIG. 1, at step 150 the user may select the customize icon 220 to customize the menu with an image, set of images or movie. This selection causes the multimedia authoring application to present the item menu 310. Finally, at step 160 the user may customize the menu with an image, a set of images or a movie. To add a still image or a set of images for a slideshow, the user needs to select photos button 360 item from the item menu 310. Selecting the movies item 370 causes the multimedia authoring application to present a movies library 700 as illustrated in FIG. 7. Note that in FIG. 7, the curtains of the movie theatre are in a different position since the curtains are continually animated.

Figure 8:
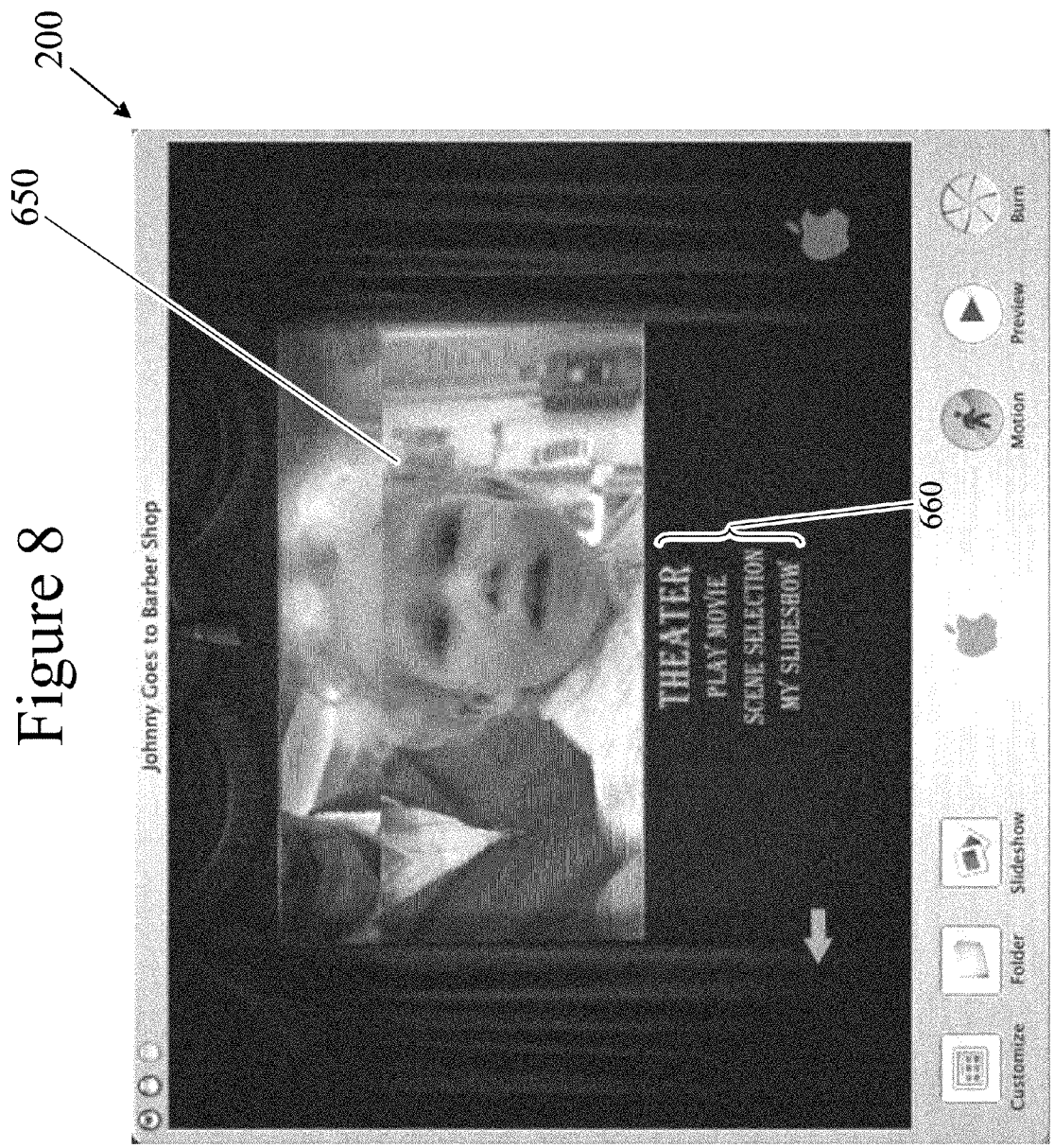
FIG. 8 illustrates the results of dropping a movie in the dropzone of the theatre menu theme.

The movies library 700 of FIG. 7 contains only one selectable movie 720. (Normally more movies would be displayed in movies library 700.) A user may add movie 720 to the menu display by dragging movie 720 to the dropzone 650 in the center of the menu display. For example, a user may drag the movie 720 of Johnny's visit to the barbershop onto the dropzone 650 and release it. Once dropped there, the theatre curtains will open and close over the movie showing Johnny's visit to the barbershop. FIG. 8 illustrates how the menu will appear after the movie has been dropped onto the dropzone 650. The amount of the movie that will be played can be specified by the user. In one embodiment, the curtain opens and closes every 30 seconds. Thus, the user can synchronize the movie in the dropzone with the curtains by specifying that only 30 seconds of the movie should be played. The opening and closing curtain effect is implemented by creating a menu theme that includes a movie of opening and closing curtains that is over laid on top of dropzone 650. The curtains in the curtain movie are deemed opaque with an alpha channel and the opening between the curtains is deemed transparent.

As mentioned earlier, in addition to movies, the user may add a photo or slideshow to the menu using the same process. Specifically, to place a still image in the dropzone 650, the photos button 360 is selected to display a set of digital images and then one of the images is dragged onto the drop zone 650. The curtains will open and close on top of the still image in that case. To place a slide show on to the menu, the user selects the photos button 360 to display a set of digital images and then drags a set of images onto the drop zone 650. The images in set of images will be displayed in sequential order in a slideshow manner. Again, the curtain will open and close over the slideshow.

As mentioned earlier, each menu theme also includes a selectable menu 660. The selectable menu includes several text selections. The user may select these text selections to play a movie, display a slideshow, or navigate to submenus. The user may modify the selectable menu text at anytime to add or delete any selectable text options.

Figure 9:
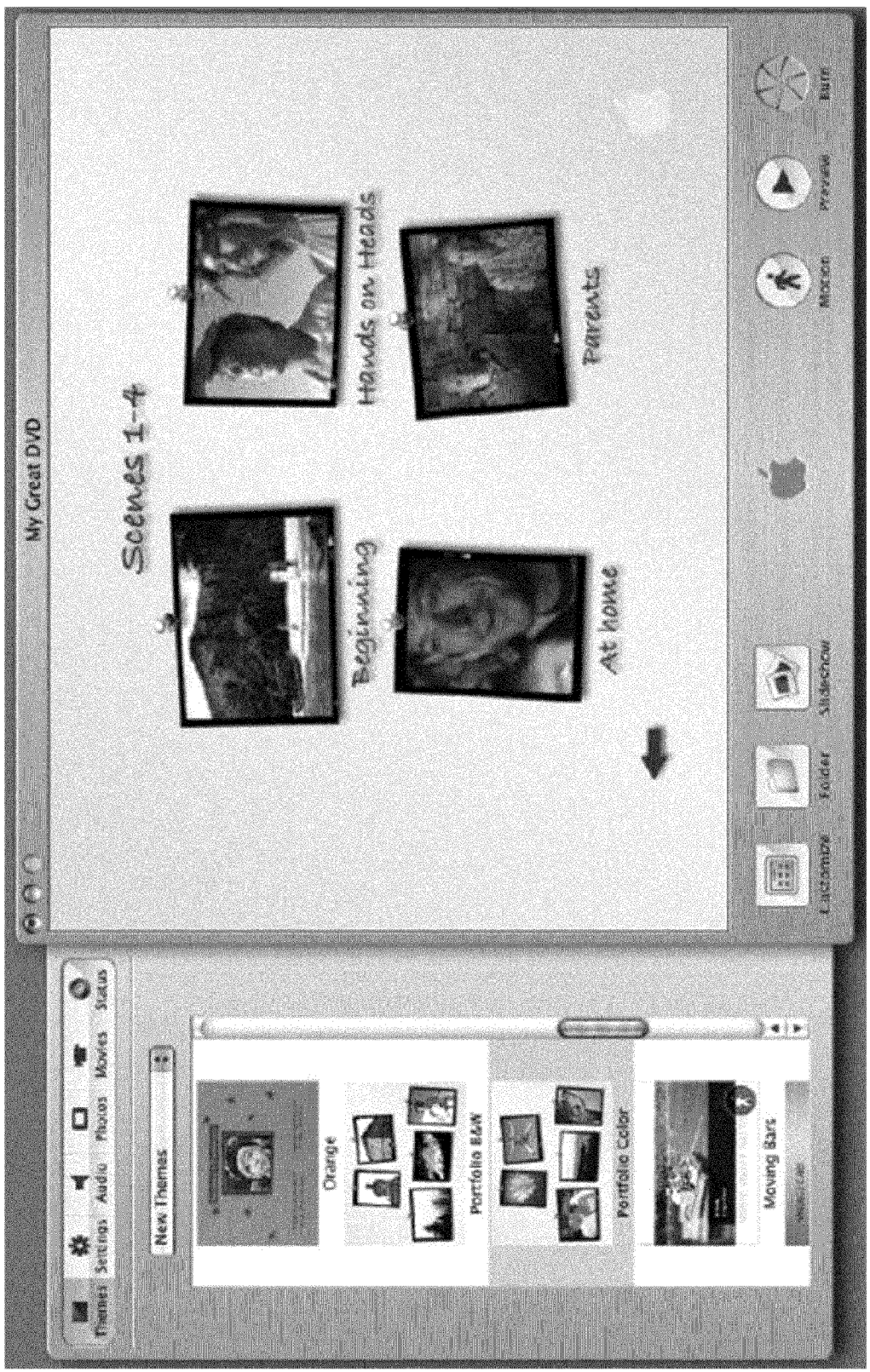
FIG. 9 illustrates the screen display of an example menu theme for a scene selection menu.

The selectable menu text may be linked to submenus that are created from their own menu theme pages. For example, if the user selects the scene selection menu item from the selectable menu 660, a scenes submenu may be displayed. FIG. 9 illustrates an example of one possible submenu that displays scene selections. The submenu screen of FIG. 9 includes four dropzones where the user may drop in movies associated with the scenes.

Multimedia Authoring Application Architecture

Figure 10:
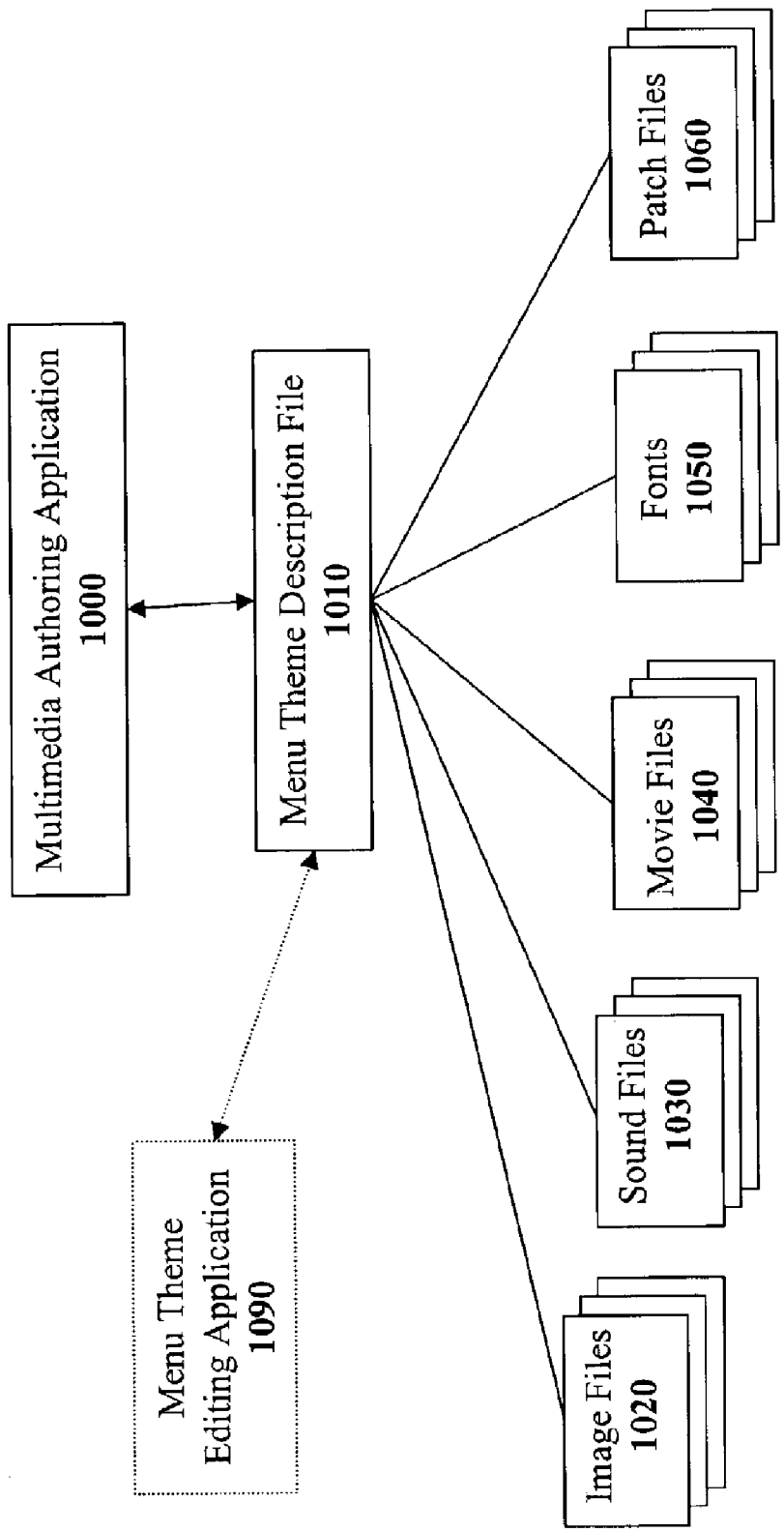
FIG. 10 illustrates one embodiment of an architecture block diagram for the multimedia authoring application.

FIG. 10 illustrates a high level block diagram of the architecture of the multimedia authoring application system. In one embodiment, the multimedia authoring application 1000 operates on an eXtensible Markup Language (XML) file that describes a menu theme. The XML files for menu themes are known as Menu Theme Description files. Similar to the manner in which HTML files describe web pages, the Menu Theme Description files describe how a menu theme will appear and where the various menu links in the menu theme are linked to. The Menu Theme Description file is supported by a number of other files that are used to render the menu. Specifically, the Menu Theme Description file refers to image files 1020 that define the background and may be placed in drop zones, audio files 1030 that are to be played in the background while the menu is displayed, movie files 1040 that make up the animations in animated menus and may be placed in dropzones, fonts 1050 that are used to render the selectable menu text, and patch files 1060 that implement special effects. The menu themes are created with a menu theme editing application 1090 that is similar to HTML editing programs.

Of particular interest in the Menu Theme Description file is the description of the dropzones. The dropzones are defined by a number of different parameters including a size and orientation, a default image for that area, a highlight image that is displayed when the mouse is moved over the dropzone, a set of special effects associated with the dropzone, an alpha value that specifies transparency, a Z-level (depth) of the dropzone, and any filters applied to graphics placed in the dropzone (For example, a Black & White filter would make all graphics appear black & white). The following XML defines a dropzone in one embodiment:

```
<key>dropZones</key>
<array>
    <dict>
        <key>BoundBox</key>
        <array>   <!--Define Dropzone Bounding Box-->
            <integer>111</integer>
            <integer>64</integer>
            <integer>420</integer>
            <integer>250</integer>
        </array>
        <key>contentScale</key>
        <integer>1</integer>
        <key>defaultContentsFileList</key>
        <array>
            <string>dropzonedefcontent.tif</string>
        </array>
        <key>defaultContentsIsImage</key>
        <true/>
        <key>defaultContentsIsSlideshow</key>
        <false/>
        <key>defaultDropBehavior</key>
        <integer>0</integer>
        <!--Define highlight image-->
        <key>highlightFile</key>
        <string>Chalk6.Highlight.tif</string>
        <key>highlightIsImage</key>
        <true/>
        <!--Specify patch file that controls operation-->
        <key>imagePatchFile</key>
        <string>DropZone</string>
        <key>maskFile</key>
        <string>Chalk6.Mask.tif</string>
        <key>maskIsImage</key>
        <true/>
        <key>shapeFile</key>
        <string>Chalk6.Shape.tif</string>
        <key>shapeIsImage</key>
        <false/>
        <key>slideshowPatchFile</key>
        <string>DropZone</string>
        <key>videoPatchFile</key>
        <string>DropZone</string>
        <key>zLevel</key> <!--Define depth-->
        <integer>0</integer>
    </dict>
</array>
```

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A non-transitory computer readable medium storing a computer program that is executable by at least one processor, said computer program for defining a menu for navigating multimedia content, said computer program comprising sets of instructions for:

from a plurality of menu themes, receiving a selection of a menu theme comprising (i) a drop-zone having a display area and (ii) a special effect associated with said drop-zone;

receiving a selection of at least one particular image to display in the display area of said drop-zone with the associated special effect applied to said particular image; and based on said menu theme, generating said menu comprising the display area with the associated special effect dynamically applied to the particular image, said menu for navigating to different sections of said multimedia content.

2. The non-transitory computer readable medium of claim 1, wherein said computer program further comprises a set of instructions for creating a distributable multimedia item comprising said multimedia content and said menu.

3. The non-transitory computer readable medium of claim 1, wherein receiving a selection of said particular image comprises having said particular image dragged and dropped into said display area of the drop-zone.

4. The non-transitory computer readable medium of claim 2, wherein said distributable multimedia item is a disc.

5. The non-transitory computer readable medium of claim 2, wherein said distributable multimedia item is a Digital Versatile Disc (DVD).

6. The non-transitory computer readable medium of claim 2, wherein said computer program further comprises a set of instructions for previewing said menu before creating said distributable multimedia item.

7. A non-transitory computer readable medium storing a computer program that is executable by at least one processor, said computer program for creating a multimedia menu for navigating a multimedia presentation, said computer program comprising sets of instructions for:
   displaying a plurality of menu themes;
   from the plurality of menu themes, receiving a selection of a menu theme that has an associated animation;
   based on the selected menu theme, presenting a menu comprising (i) a drop-zone, having a display area for displaying image content with the animation applied to the image content, and (ii) a set of controls for navigating to different sections of the multimedia presentation;
   receiving selection of a set of images for display in said display area of the drop-zone; and
   defining said menu to include said set of images in said display area with the animation dynamically applied to the set of images.

8. The non-transitory computer readable medium of claim 7, wherein navigating to different sections of said multimedia presentation comprises navigating to a submenu that displays options to play different sections of said multimedia presentation.

9. The non-transitory computer readable medium of claim 7, wherein said animation is a special effect of said menu theme that is played at least partially over the set of images in the display area of the drop-zone.

10. The non-transitory computer readable medium of claim 7, wherein said animation is automatically applied to the set of images when the display area of the drop-zone receives the set of images.

11. A method of creating a multimedia menu for navigating a multimedia presentation, said method comprising:
   displaying a plurality of menu themes;
   from the plurality of menu themes, receiving a selection of a menu theme that has an associated animation;
   based on the selected menu theme, presenting a menu comprising (i) a drop-zone having a display area for displaying image content with the animation applied to the image content, and (ii) a set of controls for navigating to different sections of the multimedia presentation;
   receiving selection of a set of images for display in said display area of the drop-zone; and
   defining said menu to include said set of images in said display area with the animation dynamically applied to the set of images.

12. The method of claim 11, wherein the animation is a special effect of said menu theme comprising an image that moves at least partially in front of said set of images in the display area of the drop-zone.

13. The method of claim 11, wherein the set of images is displayed sequentially as a preview of the multimedia presentation in the display area of the drop-zone, the method further comprising synchronizing the preview with the animation.

14. The method of claim 11, wherein said display area of the drop-zone covers only a portion of a menu screen but not the entire menu screen, and has position and orientation within the menu screen that are predefined by the selected menu theme.

15. The non-transitory computer readable medium of claim 7, wherein defining said menu comprises defining the display area of the drop-zone to display the set of images and to display the animation at least partially over the set of images.

16. The non-transitory computer readable medium of claim 7, wherein the menu theme is a first menu theme and the animation is a first special effect of said first menu theme, wherein a second menu theme has an associated second special effect that is different from the first special effect.

17. The non-transitory computer readable medium of claim 7, wherein the computer program further comprises a set of instructions for creating a distributable multimedia item comprising said multimedia presentation and said menu.

18. The non-transitory computer readable medium of claim 7, wherein the set of controls are user-editable, wherein the computer program further comprises sets of instructions for:
   receiving user edits to the set of controls; and
   editing the set of controls in response to the received user edits.

19. A non-transitory computer readable medium storing a computer program that is executable by at least one processor, said computer program for creating a multimedia menu for navigating a multimedia presentation, said computer program comprising sets of instructions for:
   in a first display section, presenting a plurality of user-selectable menu themes;
   in a second display section, presenting a plurality of different contents;
   in a third display section, presenting a user-editable menu based on a menu theme selected from the first display section, said menu comprising a menu screen with a non-user selectable drop zone display area for (i) receiving a content from the second display section through a drag-and-drop operation and (ii) presenting in real-time a display of the content in the menu with a special effect dynamically applied to the content, the drop zone display area covering only a portion of the menu screen but not the entire menu screen and having position and orientation within the menu screen that are predefined by the selected menu theme.

20. The non-transitory computer readable medium of claim 19, wherein the computer program further comprises a set of instructions for creating a distributable multimedia item comprising said multimedia presentation and said menu.

21. The non-transitory computer readable medium of claim 19, wherein the menu further comprises a set of user-editable controls for navigating to different sections of the multimedia presentation.

22. The non-transitory computer readable medium of claim 20, wherein navigating to different sections of the multimedia presentation comprises navigating to a sub-menu screen that displays options to play different sections of the multimedia presentation.

23. The non-transitory computer readable medium of claim 19, wherein the content is a video clip, wherein the drop zone display area presents the video clip in the menu by playing at least a portion of the video clip as a preview of the multimedia presentation and applying a special effect associated with the menu theme to preview.

* * * * *

UNITED STATES PATENT AND TRADEMARK OFFICE
CERTIFICATE OF CORRECTION

PATENT NO. : 7,941,757 B2
APPLICATION NO. : 12/416923
DATED : May 10, 2011
INVENTOR(S) : Ralf Weber et al.

Page 1 of 1

It is certified that error appears in the above-identified patent and that said Letters Patent is hereby corrected as shown below:

In column 1, line 9, delete "7,546,544," and insert -- 7,546,544. --, therefor.

Signed and Sealed this
Sixth Day of December, 2011

David J. Kappos
*Director of the United States Patent and Trademark Office*